Patented May 12, 1942

2,282,732

UNITED STATES PATENT OFFICE 2,282,732

COMPOSITION FOR TREATING SOIL

Owen Bevan Lean, Winkfield, Windsor, and Gilbert Armstrong, Runcorn, England, assignors to Imperial Chemical Industries Limited, a corporation of Great Britain No Drawing. Application October 17, 1938, Serial No. 235,538. In Germany October 20, 1937

3 Claims. (Cl. 167—22)

This invention relates to novel compositions of matter and more particularly to compositions for treating soil infected with eelworm.

It is well known that plants particularly root crops and tubers, for example, potatoes, are subject while growing to attack by eelworm (nematodes, e. g. *Heterodera schachtii* or *Heterodera marioni*) present in the soil with consequent impairment to both yield and quality of the crop; tomato plants especially when grown in glass houses and in pots or boxes are also subject to attack by these pests and with similar results. At the time when the soil is being prepared to receive the crop or is lying fallow, many varieties of eelworm are present as cysts, which are peculiarly resistant to outside influences and hitherto no suitable means of destroying the eelworm have been available; neither is it possible to destroy the worms during the more vulnerable stages of their life history because of the fear of damaging the growing plants.

This invention has as an object to devise a method whereby the eelworm pest may be controlled. A further object is to devise a method whereby the eelworms in soil can be rendered harmless. A still further object is to provide compositions suitable for exterminating eelworms in soil or rendering them harmless. Further objects will appear hereinafter. These objects are accomplished by the following invention.

We have now found that plants can be grown successfully in eelworm-infected soil which has been treated prior to planting the crop with a composition of matter comprising a water-soluble chloracetate and preferably a solid diluent therefor.

The solid diluent need only have the following essential properties, it must be a powder or powderable so that it can be admixed with the crushed chloracetate and it must not have any damaging effect either on the chloracetate or on the soil, it can therefore be such a substance as slaked lime, mortar rubble, chalk, calcium sulphate (gypsum) sand, or even dry soil. Diluents may also be chosen which have a fertilizing action on the soil, e. g. kainit, basic slag, or sulphate of ammonia. Again, hygroscopic properties may be imparted to the mixture by using as a diluent such a body as fused calcium chloride. More than one diluent may be used in the same mixture.

The proportion of diluent to chloracetate may vary considerably and will be determined largely by the rate at which the chloracetate is to be applied to the soil so that the bulk of the composition per unit area treated is convenient for purposes of transport, handling and for even distribution. It is convenient to refer to the amount of the composition as representing so much calcium chloracetate, and using such terminology it may be said that amounts between 112 lbs. per acre and 1120 lbs. per acre (reckoned as calcium chloracetate) will suffice depending on the extent of the infestation, and in general amounts of approximately 224 lbs. per acre are adequate. With such amounts a proportion of diluent to chloracetate of 1:20 to 2:1 is suitable.

The composition of matter may be made by grinding the solid constituents together, or by grinding them separately and then mixing them in the desired proportions. A composition which we have found to be particularly valuable is a mixture of calcium chloracetate with e. g. 5–10% of slaked lime or of chalk. This composition may be made very conveniently by mixing chloracetic acid and the appropriate excess of lime.

When treating large areas of soil, e. g. fields, the composition may be merely broadcast on the surface of the rough land but preferably it is harrowed in. This should be done several weeks e. g. 2 to 16 weeks and suitably about 6 weeks before the potato or other crop is to be planted, as, when the chloracetate is fresh in the soil, the soil is definitely phytocidal. As time evolves the phytocidal effect disappears in from 2 to 16 weeks, the time being affected by the weather, but during a period of from 2 to 5 months the chloracetate either kills or devitalizes all the eelworms in the soil.

We may also treat according to our invention smaller quantities of soil, e. g. potting soil which is to be used for growing plants in a greenhouse, and in such cases an amount of the composition corresponding to ½ lb. of calcium chloracetate per 112 lbs. of soil treated is a suitable amount. The composition is uniformly distributed throughout the soil by mixing. In six weeks or so the soil will be ready for use. Atmospheric moisture in a greenhouse is usually sufficient to promote the weathering and destroy the phytocidal properties, which weathering can be assisted by an occasional stirring and light watering of the soil.

It is also possible to devitalize the nematodes by applying the chloracetate in the form of a solution but we do not prefer this method as it is not so easy to retain the chloracetate in the soil by this means.

Beside the calcium chloracetate mentioned above we could have used any of the chloracetates of the alkali metals such as sodium chloracetate, lithium, rubidium or caesium or of the alkaline earth metals such as barium and strontium, and any other water soluble chloracetate such as ammonium, magnesium and zinc.

We prefer to use as diluents lime or chalk or similar substances which will neutralise any free acid that may be present in the chloracetate or may be formed during the weathering.

As many apparently widely different embodiments of this invention may be made without departing from the spirit and scope thereof, it is to be understood that the invention is not limited to the specific embodiments thereof except as defined in the appended claims.

We claim:

1. The method of conditioning eelworm-infected soil whereby plants may be grown therein without deleterious attacks by eelworm which comprises treating the infected soil with a water soluble chloracetate and exposing the treated soil to weathering prior to planting.

2. The method of conditioning eelworm-infected soil whereby plants may be grown therein without deleterious attacks by eelworm which comprises treating the infected soil with a water soluble chloracetate in a concentration sufficient to devitalise the eelworms, and exposing the treated soil to weathering until the concentration of chloracetate becomes non-phytocidal.

3. A soil treating composition which comprises a water-soluble chloracetate in admixture with a solid alkaline diluent capable of neutralizing any free acid that may be present in the chloracetate or that may be formed during weathering.

OWEN BEVAN LEAN.
GILBERT ARMSTRONG.